United States Patent [19]

McMillian

[11] Patent Number: 5,163,385
[45] Date of Patent: Nov. 17, 1992

[54] COAL-WATER SLURRY FUEL INTERNAL COMBUSTION ENGINE AND METHOD FOR OPERATING SAME

[75] Inventor: Michael H. McMillian, Fairmont, W. Va.

[73] Assignee: The United States of America as represented by the United States Department of Energy, Washington, D.C.

[21] Appl. No.: 851,390

[22] Filed: Mar. 12, 1992

[51] Int. Cl.⁵ .............................................. F02B 45/00
[52] U.S. Cl. ..................................... 123/23; 123/259; 123/270; 123/275
[58] Field of Search ................. 123/23, 259, 267, 270, 123/271, 275

[56] References Cited

U.S. PATENT DOCUMENTS

| | | | |
|---|---|---|---|
| 4,091,772 | 5/1978 | Heater et al. | 123/32 SP |
| 4,124,000 | 11/1978 | Genslak | 123/32 SP |
| 4,300,497 | 11/1981 | Webber | 123/270 |
| 4,323,039 | 4/1982 | Tsugekawa et al. | 123/270 |
| 4,558,664 | 12/1985 | Robben | 123/23 |
| 4,738,227 | 4/1988 | Kamo et al. | 123/23 |

OTHER PUBLICATIONS

"Coal-Fueled Diesels: Systems Development", M. H. McMillian et al., Journal of Engineering for Gas Turbines and Power, vol. 111, Jul. 1989, pp. 485-490.
"Coal-Fueled Diesel: Technology Development", Leonard, G. et al., DOE Report DOE/MC/221-81-2694, Mar. 1989.

*Primary Examiner*—Noah P. Kamen
*Attorney, Agent, or Firm*—David E. Breeden; Stephen D. Hamel; William R. Moser

[57] ABSTRACT

An internal combustion engine fueled with a coal-water slurry is described. About 90 percent of the coal-water slurry charge utilized in the power cycle of the engine is directly injected into the main combustion chamber where it is ignited by a hot stream of combustion gases discharged from a pilot combustion chamber of a size less than about 10 percent of the total clearance volume of main combustion chamber with the piston at top dead center. The stream of hot combustion gases is provided by injecting less than about 10 percent of the total coal-water slurry charge into the pilot combustion chamber and using a portion of the air from the main combustion chamber that has been heated by the walls defining the pilot combustion chamber as the ignition source for the coal-water slurry injected into the pilot combustion chamber.

14 Claims, 1 Drawing Sheet

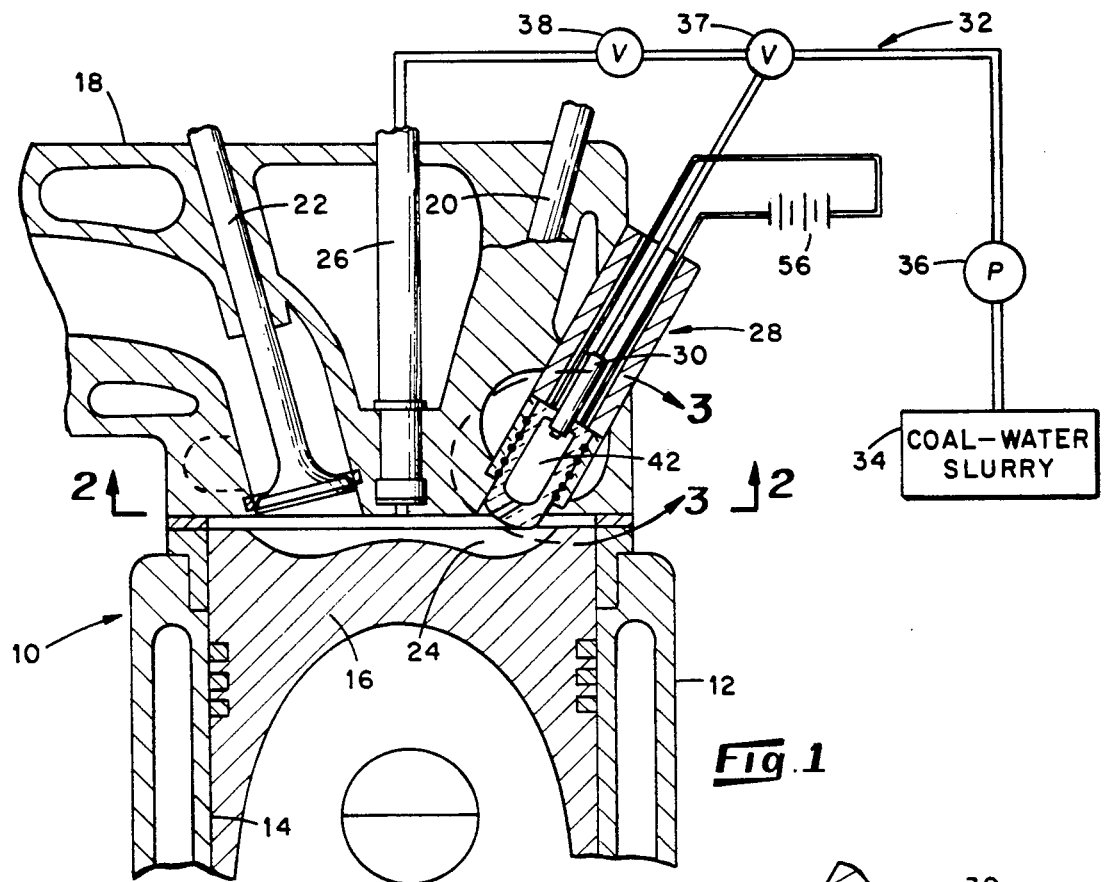
Fig.1
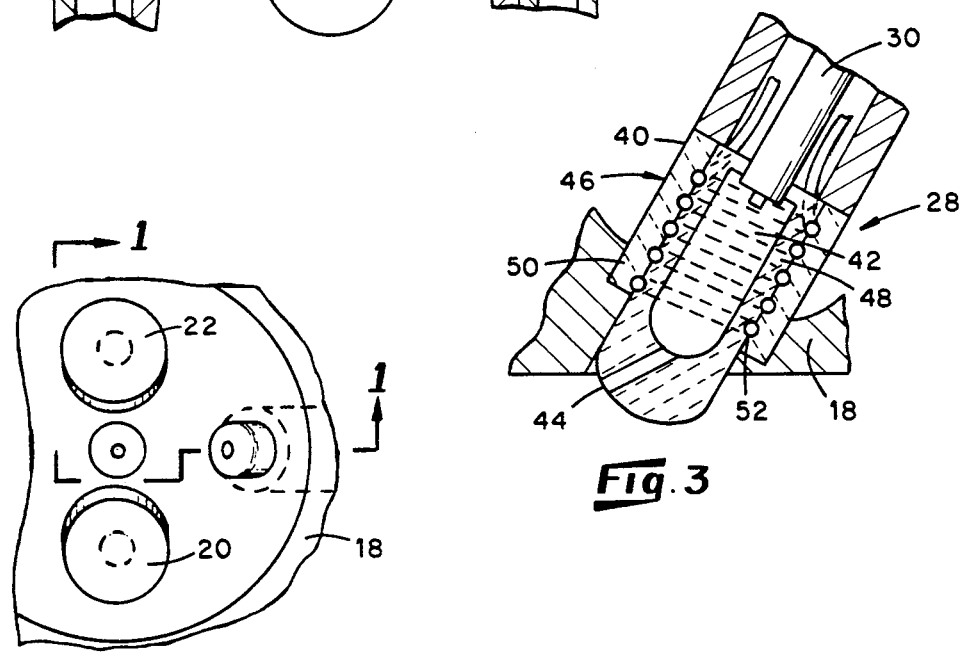
Fig.2
Fig.3

COAL-WATER SLURRY FUEL INTERNAL COMBUSTION ENGINE AND METHOD FOR OPERATING SAME

The U.S. Government has rights in this invention pursuant to the employer-employee relationship of the U.S. Department of Energy and the inventors.

BACKGROUND OF THE INVENTION

The present invention relates generally to an internal combustion engine employing coal-water slurry as the fuel, more particularly, to such an engine wherein a minor portion of each charge of the coal-water slurry fuel is injected into a pilot chamber and ignited to provide a stream of hot combustion gases for igniting the balance of the coal-water slurry fuel charge directly injected into the main combustion chamber of the engine.

Compression engines, i.e., diesel engines as pioneered by Rudolph Diesel, have long been utilized in the transportation field as well as in utility and industrial applications. The utilization of coal as the fuel for such engines has been a goal sought after since the conception of the diesel engine. While no basic thermodynamic reasons exist which would prevent the operation of a diesel engine with coal as the fuel, there were many mechanically and operational problems that had to be overcome before commercially viable coal-fuel diesel engines could be provided. For example, the erosive nature of the coal particulates in coal fuels in slurry or powder form have been found to cause a considerable impact on the durability of engine components contacted by the fuel. Also, the emission of sulfur oxides and particulates from coal-fueled engines were found to cause environmental pollution problems.

However, fairly recent developments in materials useful for fabrication of engine components contacted by the fuel have largely overcome the engine component durability problems. Further, recent developments in the preparation of the coal fuel and the developments in exhaust gas filtering mechanisms have significantly reduced the environmental problems. Even with such recent developments there is still a significant concern with respect to the use of coal as the fuel in diesel engines that has nor been adequately addressed. More specifically, in order to ignite the air and coal-fuel mixture in the engine, the air-fuel mixture must be heated to a temperature corresponding to a minimum threshold temperature required for the ignition of the fuel-air mixture. Several approaches to achieving this goal have met with various degrees of success. One such approach is the utilization of dual fuel engines in which a fuel other than the coal is ignited in the main chamber just prior to injection of the coal into the same main chamber thus providing an environment of hot combustion gases for igniting the air and coal mixture introduced into the same main combustion chamber. In some recently developed engines employing precombustion chambers, known as indirect firing, fired with an alternate fuel such as diesel fuel, there is sufficient heat retained in the engine components defining the main combustion chamber with the engine at substantially full load to operate the engine without the pilot ignition. Another approach to the use of coal as the fuel in a diesel engine is the use of a hot insulated pre-chamber in communication with the main combustion chamber into which the entire charge of coal in powder form is mixed with the intake air, this is again referred to as indirect firing. A portion of this air-coal mixture is forced into the hot prechamber during compression stroke to initiate the combustion process. In still another approach the entire charge of coal in powder form is injected into a precombustion chamber for admixture and ignition with air heated by compression and the hot walls of the engine components. While the aforementioned engines have provided significant improvements in the use of coal as the fuel, some decreases in combustion efficiencies occur. For example, engines with pre-chamber combustion chambers wherein all of the charge is introduced into the chamber, efficiency losses occur because of the higher heat transfer losses due to the larger surface area employed with respect to engines not employing precombustion chambers. Also, in the previous engines using prechambers, throttle losses are present in the throat or passageway between the pre-chamber and the main chamber that are not present in direct injected engines. Scheduling losses are also present due to the timing of the combustion process.

SUMMARY OF THE INVENTION

Accordingly, it is an object of the present invention to provide an internal combustion engine which is capable of using coal-water slurry as the only fuel in the engine at substantially all engine speeds and loads while providing combustion efficiencies greater than previously attainable with combustion systems using coal as the only fuel during engine operation after start-up.

Another object of the present invention is to utilize a coal-fired pilot chamber with a volume less than about 10 percent of that of the total clearance volume of the main combustion chamber with the piston at top dead center to provide a stream of hot gaseous combustion products for igniting a major portion of coal-water slurry fuel injected directly into the main combustion chamber so as to obviate or significantly minimize heat transfer losses, scheduling losses in the timing of the combustion process, and throttling losses in the passageway between the pilot chamber and the main combustion chamber, common in indirect injected engines.

Generally, the present invention is directed to an internal combustion engine fueled with a coal-water slurry. The engine comprises the combination of; an engine block having a cylinder with a reciprocating piston therein; a cylinder head attached to the engine block for defining with the cylinder and the piston a main combustion chamber; means for introducing a charge of air into the main combustion chamber; first fuel injecting means supported by the cylinder head and in registry with the main combustion chamber for directly injecting into the main combustion chamber a major portion of a coal-water slurry charge required for a power cycle of the engine; and ignition means for the major portion of the coal-water slurry charge that are provided by pilot chamber means supported by the cylinder head and which comprise wall means defining and enclosing a pilot combustion chamber at a location spaced from the main combustion chamber; passageway means interconnecting the pilot combustion chamber and the main combustion chamber; second fuel injecting means supported by the pilot chamber means and in communication with the pilot combustion chamber for injecting a minor portion of the coal-water slurry charge into the pilot combustion chamber for combustion thereof with a portion of the air introduced into the main combustion chamber and conveyed into the pilot combustion chamber through the passageway means to provide a stream of hot combustion gases conveyable through the passageway means into the main combustion chamber for effecting the ignition of the major portion of the coal-water slurry charge injected into the combustion chamber; and means associated with the pilot chamber means for heating the portion of air conveyed into the pilot combustion chamber to a temperature adequate to ignite the minor portion of the coal-water slurry charge upon admixture therewith.

The operation of this internal combustion engine is provided by the steps comprising: introducing the charge of air into the main combustion chamber; injecting the first charge of coal-water slurry corresponding to the minor portion of the total charge of the coal-water slurry used in a power cycle of the engine into the pilot combustion chamber for mixing with the portion of the charge of air entering the pilot combustion chamber through the passageway means; using the walls of the pilot chamber defining the pilot combustion chamber as the means for heating the portion of the charge of air conveyed into the pilot combustion chamber to a temperature adequate to effect ignition of the first charge of the coal-water slurry upon the injection thereof into the heated air for providing the stream of hot combustion gases; and then injecting the second charge of coal-water slurry which corresponds to the balance of the coal-water slurry charge used in a power cycle of the engine into the main combustion chamber in the presence of the balance of the charge of air for the ignition of the resulting air-fuel mixture upon contact with the stream of hot combustion gases.

By employing a pilot chamber with relatively small dimensions and by forming the walls of the pilot chamber with a material having high heat conductivity and high heat retention properties, the minor portion, i.e., less than about 10%, of the total coal-water slurry charge used in the engine at full load that is injected into the pilot chamber is mixed with air heated by compression and the hot walls of the pilot chamber to effect ignition of the coal-water slurry-air mixture in the pilot chamber and provide a stream of hot gaseous combustion products.

Other and further objects of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE DRAWINGS

FIG. 1 is a sectional elevational view taken generally along lines 1—1 of FIG. 2 and illustrating details of the improved internal combustion engine system of the present invention;

FIG. 2 is a bottom plan view taken generally along lines 2—2 of FIG. 1 and showing further details of a cylinder head arrangement utilized in the engine of the present invention; and FIG. 3 is a fragmentary sectional view taken along lines 3—3 of FIG. 1 illustrating details of the pilot chamber utilized for providing the ignition source for the main charge of coal-water slurry injected into the primary or main combustion chamber.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

With reference to FIGS. 1-3, the internal combustion engine of the present invention is shown at 10 in the form of a single cylinder engine of the 4-cycle variety. While the following description is directed to such an engine configuration, it is to be understood that the engine may have multiple cylinders or be of the 2-cycle variety since the principles of the present invention are equally applicable to such engine variations and modifications.

The engine 10 is shown comprising an engine block 12 incorporating a cylinder 14 in which a reciprocating piston 16 is contained. A chambered cylinder head 18 is affixed to the block 12 in the usual manner and is provided with an exhaust valve 20 and an intake valve 22. The cylinder 14, piston 16, cylinder head 18 and the heads of the valves 20 and 22 define a main combustion chamber 24. The cylinder head 16 is provided with a primary fuel injector 26 centrally positioned in the cylinder head 18 in communication with the combustion chamber 24 at a location overlying the central region of the piston 16. This engine configuration is typical of a 4-cycle engine employing compression ignition such as a diesel engine.

In accordance with the present invention, the cylinder head 18 is provided with a pilot chamber 28 in communication with the main combustion chamber 24. The pilot chamber 28 supports a second injector 30 which is in communication with an ignition or combustion chamber in the pilot chamber. These injectors 26 and 30 in the engine of the present invention are utilized to inject the total charge of the coal-water slurry fuel utilized to operate the engine of the present invention.

The injectors 26 and 30 are shown connected through a suitable piping system or conduit, as generally shown at 32, to a coal-water slurry supply 34. This conduit system 32 preferably incorporates a pump 36 capable of pumping the coal-water slurry from the supply 34 to the injectors 26 and 30 at a sufficient volume and pressure to effect the injection of the coal-water slurry through the injectors 26 and 30 for operating the engine at various speeds and loads encountered during normal engine operation with such engine speeds and loads ranging from relatively slow or idle speed to full speed and under no-load to full-load conditions. As shown, the conduit system 32 is provided with a valve 37 for supplying the injector 30 with a charge of fuel corresponding to a relatively minor portion of the total coal-water slurry charge required for operating the engine in each complete cycle under full-load conditions and sufficient for providing an adequate volume of hot combustion gases from the pilot chamber to effect the ignition of the balance of the coal-water slurry charge injected through injector 26 into the main combustion chamber 24. The portion of the conduit system 32 coupling the coal-water slurry supply 34 to the main fuel injector 26 is provided with a valve 38 for regulating the volume of fuel injected into the main combustion chamber 24 as required for operating the engine under various speed and load conditions.

The valves 37 and 38 are utilized for describing the invention and could be readily replaced by any suitable conventional mechanical or electronic metering devices as is well known in the fuel control art. As will be pointed out in greater detail below, the portion of the fuel charge injected into the pilot chamber 30 is maintained at a substantially constant ratio with respect to the total charge of coal-water slurry fuel injected into the primary combustion chamber under full load conditions. Also, as will be described in greater detail below, the minor portion of the coal-water slurry charge is injected into the pilot chamber 28 at a time prior to the injection of the major portion of the coal-water slurry charge into the main combustion chamber 24 through the injector 26. The timing of these injections may be provided by using any suitable mechanical or electronic control.

The pilot chamber 28 comprises a generally cylindrical housing 40 mounted in a suitable chamber or bore in the cylinder head 18 and affixed thereto in any suitable manner, such as by a pressed fit. The housing 40 is provided with a cylindrical or spheroidal cavity or pilot combustion chamber 42 and an elongated bore or passageway 44 which extends from the pilot combustion chamber to the main combustion chamber 24. The pilot combustion chamber 42 is of a volume corresponding to less than about 10 percent, preferably about 5 percent, of the total clearance volume of the main combustion chamber 24 when the piston 16 is at top dead center. The fuel injector 30 communicates with the pilot combustion chamber 42 at an upper end thereof, i.e., at the end thereof opposite to the passageway 44.

The passageway 44 is of a diameter sufficient to convey an adequate portion of the total air charge introduced into the main combustion chamber 24 through the intake valve 22 during the compression cycle to support the combustion of the minor portion of the coal-water slurry fuel charge injected into the pilot combustion chamber 42. This portion of the air charge corresponds to less than about 10 percent, preferably about 5 percent, of the total air charge introduced into the main combustion chamber 24.

The housing 40 of the pilot chamber 28 is preferably mounted in the cylinder head 18 at an angle to the longitudinal axis to the cylinder 14 so as to assure that the stream of hot combustion gases discharged from the pilot combustion chamber 42 will be directed towards the center of the main combustion chamber 24 for contacting the atomized charge of the coal-water slurry injected into the main combustion chamber 24 through the main injector 26 and effecting rapid ignition of the fuel-air mixture in the main combustion chamber 24. Preferably, the passageway 44 is also inclined at an angle of about 10° to 45° to the longitudinal axis of the housing 40 to provide a swirling motion to the air forced into the pilot combustion chamber 42 through the passageway 44 during the compression cycle of the engine for enhancing both the convective heating of the air by the walls of the combustion chamber 42 and the mixing of the heated air with the portion of the coal-water slurry charge injected into the pilot combustion chamber 42. This passageway 44 is preferably of an elongated configuration so that the stream of hot combustion gases discharged from the pilot combustion chamber 42 will be in the form of a relatively high velocity jet which penetrates into the combustion chamber 24 and enhances the contact of the hot combustion gases with the fuel-air mixture within the main combustion chamber 24. Further, while only a single passageway 44 is shown it will appear clear that several passageways can be utilized in place of the single passageway since it is believed that the use of such a plurality of passageways may facilitate the conveyance of the compressed air into the pilot combustion chamber 42 and to enhance the discharge of the hot combustion gases from the pilot chamber 28 into the main combustion chamber 24.

In order to provide for the ignition of the mixture of the coal-water slurry and air in the pilot combustion chamber 28, the walls 46 of the housing 40 are formed of a material characterized by high specific heat, high heat capacity, and high thermal conductivity. By using such a material for the formation of the walls 46 of the housing 40, the walls can be heated to a sufficient temperature by a combustion event in the pilot combustion chamber 42 to effect ignition of a substantially stoichiometric to fuel-rich coal-water slurry-air mixture in the pilot combustion chamber 42. These walls 46 convectively transfer a sufficient portion of the stored heat from each combustion event to an incoming compression-heated air charge from the main combustion chamber 24 for heating the air charge to a temperature at least as great as the minimum threshold temperature that is required for the ignition of the coal-water slurry-air mixture in the pilot combustion chamber 42. The housing wall 46 also undergo rapid temperature cycling in that the walls are rapidly heated by the combustion gases produced within the pilot combustion chamber 42 and then are rapidly cooled by the convective heating of the air charge entering the pilot combustion chamber for the next combustion event. The walls 46 of the housing 40 should have an adequate mass to store a sufficiently large amount of heat to provide for the ignition of the fuel-air mixture in the pilot combustion chamber 42 even at low engine speed and under no-load conditions. Normally, at higher engine speeds and under higher load conditions such as encountered during normal engine operation, the walls 46 of the housing 40 are heated to temperatures of about 1,000° to 1,500° F. which are significantly higher than the minimum threshold ignition temperature so as to heat the air-fuel charge in the pilot combustion chamber 42 to temperatures greater than the minimum threshold temperature.

The materials found to satisfactory for forming the walls 46 of the housing 40 include such refractory materials such as partially stabilized zirconia or silicon nitrate, or by providing a suitable air gap between the housing 40 and the cylinder head or between the inner and outer wall layers 48 and 50. Preferably, the walls 46 are of a layered construction with the innermost wall layer 48 being formed of a relatively high density form of the selected material that is characterized by the aforementioned desirable high heat conductivity and heat retaining properties while the outermost wall layer 50 is formed of a heat insulating material such as a relatively low density or fibrous form of the inner layer material. By so forming the walls 46 with a layered construction, heat losses from the walls 46 to the surrounding engine environs is maintained at relatively low levels that are insufficient to cool the walls 46 to temperatures less than the minimum threshold ignition temperature for the coal-water slurry fuel-air mixture even when the engine is operating at low speed under no-load conditions.

In order to start the engine 10, the wall layer 48 is preheated to a temperature of at least about 1,000° F.

before any injection of the coal-water slurry. This heating of wall 48 may be readily provided by employing an electrical resistance heater arrangement generally shown at 52 and provided by incorporating several turns of a suitable resistive heating wire between the wall layers 48 and 50. With these wires so placed, the insulating layer 50 minimizes heat loss while the inner layer 48 is being heated sufficiently to heat the air introduced into the pilot combustion chamber 42 to at least the minimum threshold temperature required for the ignition of the coal-water slurry-air mixture. The resistance heater 52 may be connected to a suitable electrical source such as a storage battery shown at 56.

In some instances, such as where the engine 10 is used in a relatively cold climate, the start-up of the engine 10 may be facilitated by the injection of a fuel such as diesel or natural gas into the electrically heated pilot chamber rather than a coal-water slurry. Of course, after start-up and after the walls 46 including wall 48 of the housing 40 become sufficiently hot to effect ignition of the coal-water slurry-air mixture in the pilot combustion chamber, the feed of the start-up fuel is terminated and replaced with the coal-water slurry. By employing such an alternate fuel solely for start-up purposes, the quantity of fuel required for start-up fuel is relatively small and easily transported along with the main fuel supply.

In the present invention, preferably less than about 10 percent, preferably close to about 5 percent, of the total charge of the coal-water slurry utilized for engine operation at full-load is injected into the pilot combustion chamber 26. Once ignition occurs within the pilot combustion chamber 42, the temperature rapidly increases and as the hot burning gases exit the pilot chamber due to the expansion of the burning gases, these gases rapidly heat the walls 46. During the latter part of the engine power cycle and the exhaust cycle, the heat transfer rates from the walls 46 to any residual gases and air in the pilot chamber is relatively small as compared to heat transfer rates occurring during combustion in the early part of the expansion stroke and during the latter part of the compression stroke.

It will be seen that the present invention provides an improved internal combustion engine which is capable of utilizing a coal-water slurry as the only fuel during the entire engine operation. The utilization of the hot insulated pilot chamber for providing an ignition source for a minor portion of coal-water slurry charge provides a desirable ignition source for the balance of the coal-water slurry charge injected directly into the main chamber of the engine.

What is claimed is:

1. An internal combustion engine fueled with a coal-water slurry comprising in combination an engine block having a cylinder with a reciprocating piston therein, a cylinder head attached to the engine block for defining with the cylinder and the piston a main combustion chamber, means for introducing a charge of air into the main combustion chamber, first fuel injecting means supported by the cylinder head and in registry with the main combustion chamber for directly injecting into the combustion chamber a major portion of a coal-water slurry charge required for a power cycle of the engine, and ignition means for the major portion of the coal-water slurry charge provided by pilot chamber means supported by the cylinder head and comprising wall means defining and enclosing a pilot combustion chamber at a location spaced from the main combustion chamber, passageway means interconnecting the pilot combustion chamber and the main combustion chamber, and second fuel injecting means supported by the pilot chamber means and in registry with the pilot combustion chamber for injecting a minor portion of the coal-water slurry charge into the pilot combustion chamber for combustion thereof with a portion of the air introduced into the main combustion chamber and conveyed into the pilot combustion chamber through said passageway means to provide a stream of hot combustion gases conveyable through said passageway means into the main combustion chamber for effecting the ignition of the major portion of said coal-water slurry charge injected into the main combustion chamber, and means associated with said pilot combustion chamber for heating the portion of air conveyed into the pilot combustion chamber to a temperature adequate to ignite said minor portion of the coal-water slurry charge upon the admixture therewith in the pilot combustion chamber.

2. An internal combustion engine fueled with a coal-water slurry as claimed in claim 1, wherein the pilot combustion chamber is of a volume corresponding to about 5 to 10 percent of the volume of the main combustion chamber with the piston at top dead center.

3. An internal combustion engine fueled with a coal-water slurry as claimed in claim 2, wherein the second fuel injector means is adapted to inject the minor portion of the coal water slurry charge into the pilot combustion chamber corresponding to about 5 to 10 percent of the total charge of the coal-water slurry charge injected into the engine at full load during each full cycle of the engine.

4. An internal combustion engine fueled with a coal-water slurry as claimed in claim 3, wherein said means associated with the pilot combustion chamber for heating the portion of air conveyed into the latter comprises wall means defining the pilot combustion chamber wherein said wall means also define said passageway, and wherein said wall means comprise a material having a sufficiently high level of heat conductivity and heat retention to heat the portion of the air entering the pilot combustion chamber to a temperature corresponding to at least a minimum threshold temperature required for the ignition of coal-water slurry-air admixture in the pilot combustion chamber.

5. An internal combustion engine fueled with a coal-water slurry as claimed in claim 4, wherein said material is selected from partially stabilized zirconia, silicon nitrate or combinations thereof.

6. An internal combustion engine fueled with a coal-water slurry as claimed in claim 4, wherein said wall means defining the pilot combustion chamber and the passageway are heated to at least said temperature corresponding to the minimum threshold temperature by the combustion of the admixture of the coal-water slurry and air in the pilot combustion chamber, and wherein further heating means are associated with the wall means defining the pilot combustion chamber for initially heating the wall means defining the pilot combustion chamber to a temperature at least corresponding to said minimum threshold temperature for engine start-up and prior to any injection of coal-water slurry into the pilot combustion chamber.

7. An internal combustion engine fueled with a coal-water slurry as claimed in claim 6, wherein said further heating means comprises an electrical resistance heater supported by said wall means.

8. An internal combustion engine fueled with a coal-water slurry as claimed in claim 6, wherein said wall means is formed of inner and outer layers with the inner layer provided by the material having the sufficiently high level of heat conductivity and heat retention to heat the portion of air the entering the pilot combustion chamber to the temperature corresponding to at least said minimum threshold temperature and with the outer layer being provided by a material having substantially less heat conductivity than the inner layer for reducing heat losses from said wall means.

9. An internal combustion engine fueled with a coal-water slurry as claimed in claim 8, wherein said further heating means are disposed intermediate the inner and outer layers of the wall means, and wherein said further heating means comprises electrical resistance heating means.

10. A method for operating an internal combustion engine on a coal-water slurry fuel, comprising the steps of:
providing a main combustion chamber defined by a cylinder, piston and cylinder head;
providing a wall-defined pilot combustion chamber in the cylinder head;
providing a passageway interconnecting the pilot combustion chamber and the main combustion chamber;
introducing a charge of air into the main combustion chamber;
injecting a first charge of coal-water slurry corresponding to a minor portion of the total charge of coal-water slurry used in a power cycle in the engine into the pilot combustion chamber for mixing with a portion of the charge of air entering the pilot combustion chamber through the passageway;
heating the portion of the charge of air entering and within the pilot combustion chamber to a temperature adequate to effect ignition of the first charge of the coal-water slurry upon the injection thereof into the heated air for providing a stream of hot combustion gases; and
injecting a second charge of coal-water slurry into the main combustion chamber in the presence of the balance of the charge of air for the ignition of the resulting air-fuel mixture upon contact with a stream of hot combustion gases conveyed into the main combustion chamber from the pilot combustion chamber through the passageway.

11. A method for operating an internal combustion engine on a coal-water slurry fuel as claimed in claim 10, including the step of providing the pilot combustion chamber with a volume less than 10 percent of the total clearance volume of main combustion chamber with the piston at top dead center, and wherein the minor portion of the of coal-water slurry corresponds to less than about 10 percent of the total charge of the coal-water slurry injected into the engine with the engine at substantially full load.

12. A method for operating an internal combustion engine on a coal-water slurry fuel as claimed in claim 11, wherein the step of heating the portion of the air entering the pilot combustion chamber through the passageway is provided by forming the walls of at least the pilot combustion chamber of a material characterized by adequate thermal conductivity and heat retention to absorb sufficient heat from the hot combustion gases in the pilot combustion chamber and then transferring such absorbed heat to heat the portion of air entering the pilot combustion chamber to said temperature.

13. A method for operating an internal combustion engine on a coal-water slurry fuel as claimed in claim 12, wherein said material is selected from partially stabilized zirconia, silicon nitrate, or mixtures thereof.

14. A method for operating an internal combustion engine on a coal-water slurry fuel as claimed in claim 12, including the additional step of providing the walls of at least the pilot combustion chamber with electrical heating means for heating the walls to at least said temperature during engine start-up.

* * * * *